United States Patent
Kim et al.

(10) Patent No.: US 12,095,021 B2
(45) Date of Patent: Sep. 17, 2024

(54) BATTERY CELL SEALING DEVICE

(71) Applicant: SK On Co., Ltd., Seoul (KR)

(72) Inventors: Joo Hyung Kim, Daejeon (KR); Yeon Ho Park, Daejeon (KR); Gil Yong Choi, Daejeon (KR); Hyung Joon Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 238 days.

(21) Appl. No.: 17/840,092

(22) Filed: Jun. 14, 2022

(65) Prior Publication Data

US 2022/0399563 A1 Dec. 15, 2022

(30) Foreign Application Priority Data

Jun. 14, 2021 (KR) .................. 10-2021-0076472

(51) Int. Cl.
*H01M 10/04* (2006.01)
*H01M 50/105* (2021.01)
*H01M 50/183* (2021.01)

(52) U.S. Cl.
CPC ..... *H01M 10/0404* (2013.01); *H01M 50/105* (2021.01); *H01M 10/0481* (2013.01); *H01M 50/183* (2021.01)

(58) Field of Classification Search
CPC ......... H01M 10/0404; H01M 10/0481; H01M 50/105; H01M 50/183
See application file for complete search history.

(56) References Cited

FOREIGN PATENT DOCUMENTS

| | | |
|---|---|---|
| KR | 10-0433836 B1 | 5/2004 |
| KR | 10-1644116 B1 | 7/2016 |
| KR | 10-1753336 B1 | 7/2017 |
| KR | 10-1957503 B1 | 3/2019 |
| KR | 10-2042775 B1 | 11/2019 |
| KR | 10-2067715 B1 | 1/2020 |
| KR | 10-2092269 B1 | 3/2020 |
| WO | 2014/016078 A1 | 1/2014 |
| WO | 2015/030373 A1 | 3/2015 |
| WO | WO-2021194293 A1 * | 9/2021 |

OTHER PUBLICATIONS

EPO machine generated English translation of WO-2021194293-A1 (Year: 2021).*
EPO machine generated English translation of WO-2014016078-A1 (Year: 2014).*
Extended European Search Report for the European Patent Application No. 22178778.1 issued by the European Patent Office on Nov. 16, 2022.

* cited by examiner

*Primary Examiner* — Christopher P Domone
*Assistant Examiner* — Kimberly Wyluda
(74) *Attorney, Agent, or Firm* — IP & T GROUP LLP

(57) ABSTRACT

The present invention relates to a battery cell sealing device for sealing a pouch of a battery cell, more particularly, to a battery cell sealing device configured to be capable of simultaneously sealing a plurality of battery cells accommodated in one chamber to be able to increase production or processing capacity of the battery cells in one chamber and accordingly, decrease cost of an entire equipment.

13 Claims, 4 Drawing Sheets

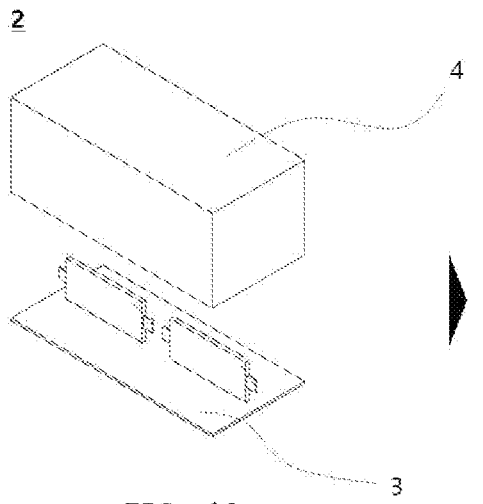
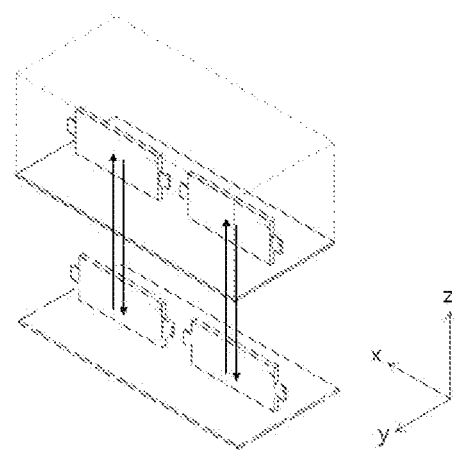
FIG. 1A    FIG. 1B
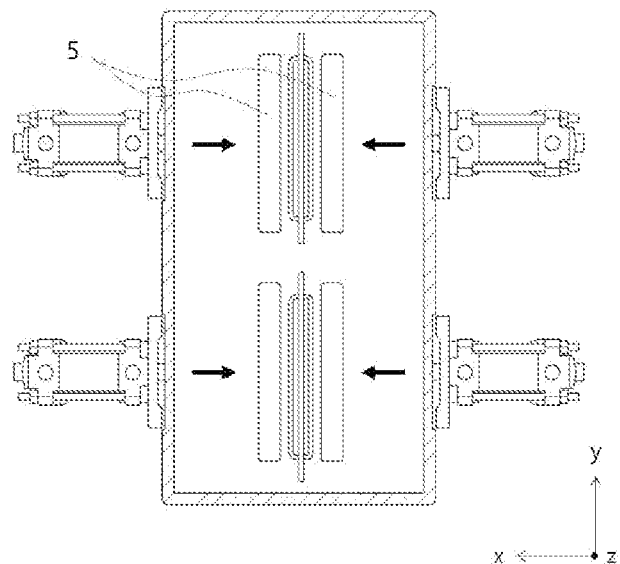
FIG. 2

BATTERY CELL SEALING DEVICE

CROSS-REFERENCE TO RELATED APPLICATIONS

This application claims priority under 35 U.S.C. § 119 to Korean Patent Application No. 10-2021-0076472, filed on Jun. 14, 2021, in the Korean Intellectual Property Office, the disclosure of which is incorporated herein by reference in its entirety.

TECHNICAL FIELD

The following disclosure relates to a battery cell sealing device for sealing a pouch of a battery cell. More particularly, the following disclosure relates to a battery cell sealing device configured to be capable of simultaneously sealing a plurality of battery cells accommodated in one chamber to be able to increase production or processing capacity of the battery cells in one chamber and accordingly, decrease cost of an entire equipment.

BACKGROUND

In general, batteries obtain electrical energy using a chemical or physical reaction, and such chemical batteries are divided into primary batteries and secondary batteries. That is, batteries that are used once and then discarded, such as manganese batteries, alkaline batteries, and mercury batteries, are called primary batteries, and batteries that may be recharged and used after running out of electricity, such as rechargeable batteries or lead storage batteries, are called secondary batteries. The development of technology for secondary batteries that are easily applied according to product groups and have electrical characteristics such as high energy density among them has been demanded.

The secondary batteries may be mainly classified into cylindrical batteries, prismatic batteries, pouch-type batteries, and the like, according to their appearances. Among them, the pouch-type batteries that are easily deformed, have low manufacturing cost, and have a small weight have been widely used.

A method of manufacturing the pouch-type secondary battery will be described. An electrode assembly is first embedded in a pouch case, and an electrolyte is then injected into the pouch case to be impregnated into the electrode assembly. Then, edge portions of the pouch case are bonded to each other to be sealed. Then, an aging process is performed, and a charging/discharging process for activating battery cells is then performed. When the charging/discharging process is performed, an irreversible reaction between the electrolyte and an additive occurs and a gas is generated. In order to remove the gas generated as described above, a degassing process is performed through a degassing device, and a sealing process of sealing edge portions of the battery cell is performed after the gas is removed. Each of these processes may be performed through an automated device.

FIGS. 1A and 1B are views illustrating a battery cell pouch sealing device according to the related art, wherein FIG. 1A illustrates a battery cell stand-by state, and FIG. 1B illustrates a battery cell input state. As illustrated in FIGS. 1A and 1B, the battery cell pouch sealing device 2 according to the related art includes a seating plate 3 on which battery cells are seated and a vacuum chamber 4 accommodating the battery cells, and in a state in which two battery cells are seated in a row on the seating plate 3, the seating plate 3 moves in an upward direction, such that the battery cells are input into the vacuum chamber 4.

FIG. 2 is a schematic view illustrating that pouches of the battery cells input into the vacuum chamber in FIGS. 1A and 1B are sealed. As illustrated in FIG. 2, both side surfaces of the pouch of the battery cell are pressed using sealing bars 5 from each of both sides of a pouch case to seal one side of the pouch.

The battery cell pouch sealing device according to the related art as described above is configured so that only two battery cells are accommodated in one chamber. In this case, the two battery cells are arranged in a row in order to press both side surfaces of the pouch of each battery cell from both sides. In addition, the battery cells are vertically moved in a vertical direction to be input into the chamber.

However, the battery cell pouch sealing device according to the related art having such a structure has a problem that cell processing capacity or processing speed is insufficient because only the two cells may be accommodated in one chamber. In order to overcome such a problem, the battery cell pouch sealing device according to the related art should include a plurality of chambers in an entire equipment, but there is a limitation in disposing a desired number of chambers due to a limited layout of a factory and due to an increase in the number of chambers, the number of vacuum pumps corresponding to the respective chambers is also increased, such that equipment investment cost is excessively generated.

RELATED ART DOCUMENT

[Patent Document]
(Patent Document 1) Korea Patent No. 10-1753336 (2017 Jun. 27)

SUMMARY

An embodiment of the present disclosure is directed to providing a battery cell sealing device configured to be capable of simultaneously sealing a plurality of battery cells accommodated in one chamber to be able to increase production or processing capacity of the battery cells in one chamber and accordingly, decrease cost of an entire equipment.

In one general aspect, a battery cell sealing device includes: a jig plate on which a plurality of battery cells are seated; a chamber in which the jig plate on which the battery cells are seated is accommodated; and a sealing unit sealing each of the battery cells accommodated in the chamber, wherein the battery cells are arranged in at least two rows in the chamber, and at least two battery cells are disposed in each row, and the sealing unit seals each of the battery cells by pressing both outer side surfaces of a pouch of each of the battery cells.

The sealing unit may include: a first sealing unit pressing and sealing one side surfaces of pouches of first-row battery cells disposed in the outermost one row among the battery cells arranged in the at least two rows; a second sealing unit pressing and sealing the other side surfaces of pouches of second-row battery cells disposed in the outermost other row among the battery cells arranged in the at least two rows; and a third unit positioned between two adjacent rows of the battery cells arranged in the at least two rows and pressing and sealing the other side surfaces of pouches of battery cells disposed in one row of the two adjacent rows and press and seal one side surfaces of pouches of battery cells disposed in the other row of the two adjacent rows.

The first unit may include first cylinders driven in a transverse axis direction and first sealing bars receiving thrusts in the transverse axis direction by the driving of the first cylinders in the transverse axis direction and pressing the one side surfaces of the pouches of the first-row battery cells, and the second unit may include second cylinders driven in the transverse axis direction and second sealing bars receiving thrusts in the transverse axis direction by the driving of the second cylinders in the transverse axis direction and pressing the other side surfaces of the pouches of the second-row battery cells.

The first unit may be provided with the same number of the first cylinders as the number of first-row battery cells, such that the first cylinders are provided for the first-row battery cells, respectively, and the second unit may be provided with the same number of the second cylinders as the number of second-row battery cells, such that the second cylinders are provided for the second-row battery cells, respectively.

The third unit may include a third cylinder driven in a longitudinal axis direction, a thrust conversion unit converting a thrust in the longitudinal axis direction by the driving of the third cylinder in the longitudinal axis direction into a thrust in a transverse axis direction, and third sealing bars receiving the thrust in the transverse axis direction from the thrust conversion unit and each pressing the other side surfaces of the pouches of the battery cells disposed in one row of the two adjacent rows and the one side surfaces of the pouches of the battery cells disposed in the other row of the two adjacent rows.

The thrust conversion unit may include: a cam body receiving the thrust in the longitudinal axis direction from the third cylinder and reciprocating linearly in the longitudinal axis direction; and a follower having one end in contact with a cam actuating element formed in the cam body and the other end coupled to the third sealing bar and reciprocating linearly along an outer surface of the cam actuating element in the transverse axis direction.

The cam actuating element may have a structure including a wedge surface inclined with respect to the longitudinal axis direction.

A plurality of cam actuating elements may be formed in the cam body so that two or more cam actuating elements are provided for each of the third sealing bars, and the third sealing bar may be supported by two or more followers.

A bearing may be provided at one end portion of the follower in contact with the outer surface of the cam actuating element.

One end portion of the follower in contact with the outer surface of the cam actuating element may be formed as a curved surface.

One third cylinder may be provided in the third unit.

The jig plate may be slid in a direction horizontal to a bottom surface of the chamber to be input into the chamber.

A chamber inlet through which the jig plate is to be input into the chamber may be formed in one side surface of the chamber, and the sealing unit may be disposed on the other side surfaces of the chamber except for the one side surface of the chamber in which the chamber inlet is formed.

A chamber cover closing the chamber may be coupled to the jig plate, and the jig plate may be input into the chamber and at the same time, the chamber may be closed by the chamber cover.

The battery cells may be arranged in a 2×2 array form in the chamber.

BRIEF DESCRIPTION OF THE DRAWINGS

FIGS. 1A and 1B are views illustrating a battery cell pouch sealing device according to the related art.

FIG. 2 is a schematic view illustrating that battery cells input into a vacuum chamber in FIGS. 1A and 1B are sealed.

FIGS. 4A to 5 are views illustrating a battery cell sealing device according to an embodiment of the present invention.

DETAILED DESCRIPTION OF MAIN ELEMENTS

Figure 3:
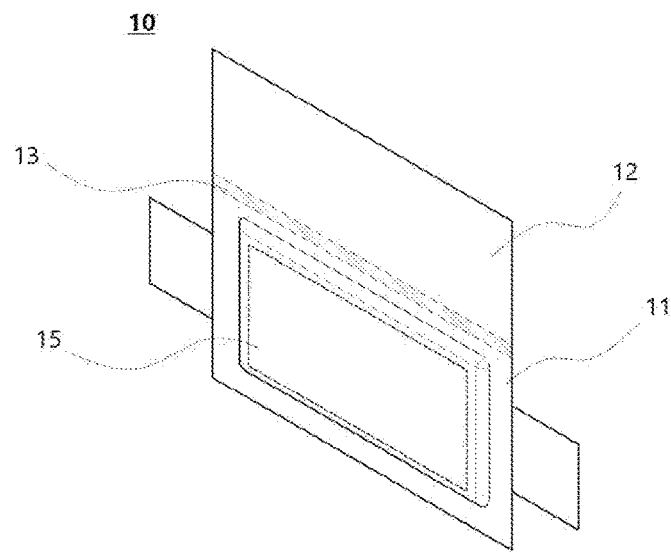
FIG. 3 is a view illustrating a battery cell.

1: battery cell sealing device
10: battery cell
100: jig plate
200: chamber
300: sealing unit
310: first unit
320: second unit
330: third unit

DETAILED DESCRIPTION OF EMBODIMENTS

Hereinafter, the present invention will be described in detail with reference to the accompanying drawings.

A battery cell 10 will be first described before a battery cell sealing device 1 according to the present invention is described. FIG. 3 is a view illustrating a battery cell. As illustrated in FIG. 3, the battery cell 10 is a pouch-type secondary battery, and may include a pouch 11 having a hollow part formed at an inner side thereof and having an approximately rectangular parallelepiped shape and an electrode assembly 15 accommodated in the pouch, wherein the electrode assembly may include a positive electrode plate, a negative electrode plate, a separator, and the like. A gas pocket part 12 extending from an edge portion of the pouch 11 to discharge a gas generated from the inside of the pouch 11 to the outside in a degassing process may be formed on one side of the pouch 11. The battery cell sealing device 1 according to the present invention may seal one side 13 of the gas pocket part 12 in the pouch-type battery cell 10 having such a structure.

Figures 4A, 4B:
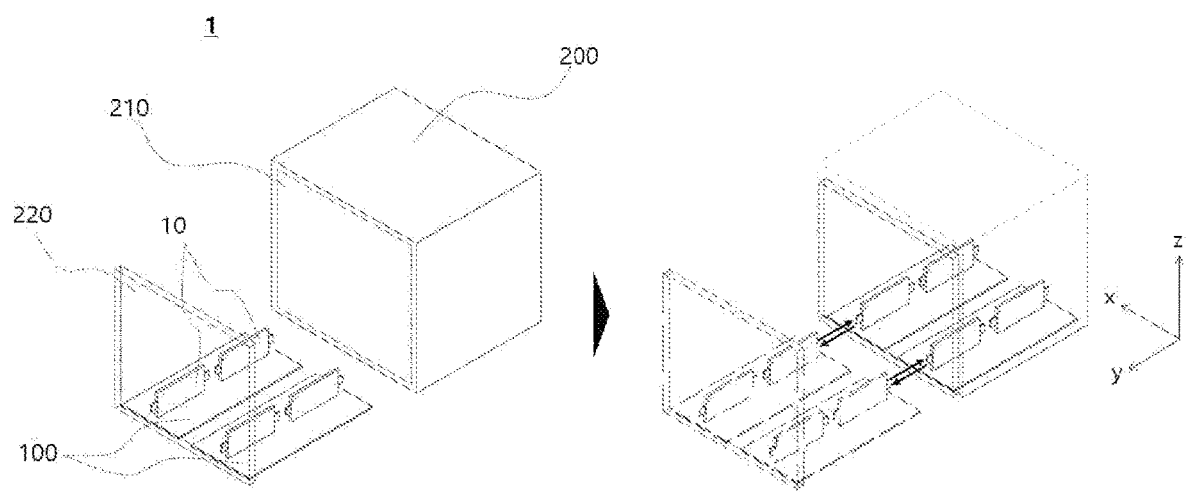
Figure 5:
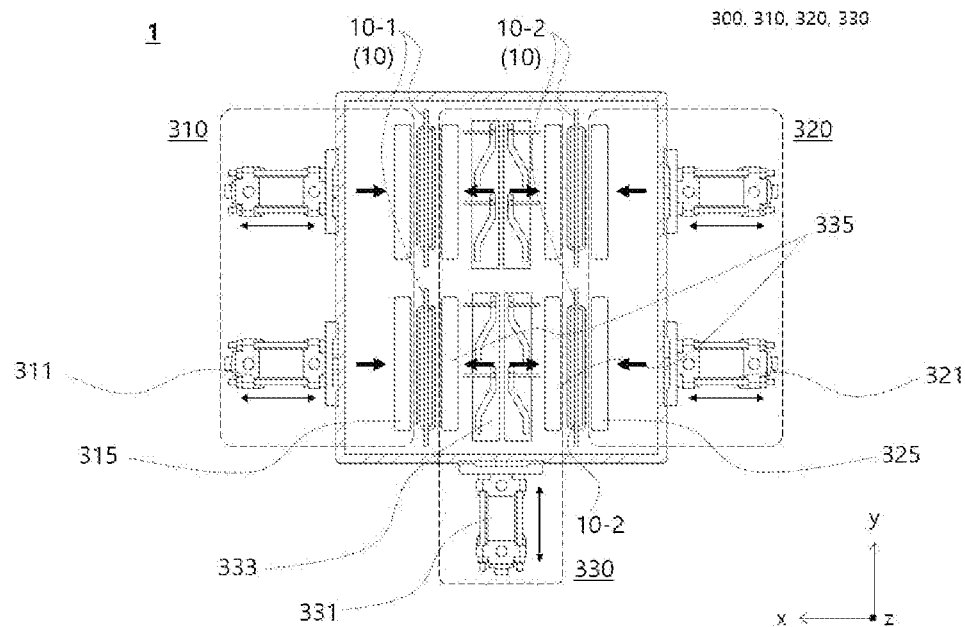

Hereinafter, a battery cell sealing device 1 according to the present invention will be described. FIGS. 4A to 5 are views illustrating a battery cell sealing device according to an embodiment of the present invention, wherein FIG. 4A illustrates a battery cell standby state, FIG. 4B illustrates a battery cell input state, and FIG. 5 illustrates a top view of FIG. 4B. As illustrated in FIGS. 4A to 5, the battery cell sealing device 1 according to the present invention mainly includes a jig plate 100, a chamber 200, and a sealing unit 300. In addition, the battery cell sealing device 1 according to the present invention may further include a driving unit (not illustrated) for inputting the jig plate 100 into the chamber 200.

The jig plate 100 provides a mounting space in which a plurality of battery cells 10 are seated, and may be formed in a wide plate shape, and a fixing means capable of fixing each of the battery cells 10 seated on the jig plate 100 may be provided on the jig plate 100. The fixing means may have various known structures, and the structures of the fixing means are not particularly limited in the present invention. Meanwhile, a structure in which the jig plate 100 is separated into a plurality of (two) plates has been illustrated in FIGS. 4A and 4B, but the jig plate 100 may have a single plate structure unlike described above, and in the present invention, the jig plate 100 may refer to the entirety of the single plate structure as described above.

The chamber 200 is a box-shaped space accommodating the jig plate 100 on which the battery cells 10 are seated, and the chamber 200 according to the present invention may be a vacuum chamber capable of sealing the battery cells 10 under a vacuum atmosphere. To this end, a vacuum pump (not illustrated) may be provided in the chamber 200. In addition, a chamber inlet 210 opened so that the jig plate 100 may enter and exit from the chamber 200 may be formed at one side of the chamber 200.

The sealing unit 300 seals each of the battery cells 10 accommodated in the chamber 200, and is configured to be capable of sealing each of the battery cells 10 by pressing both outer side surfaces of the pouch of each of the battery cells 10. More specific contents of the sealing unit 300 will be described later.

In this case, in the battery cell sealing device 1, the battery cells 10 may be arranged in at least two rows in the chamber 200, that is, on the jig plate 100 accommodated in the chamber 200, and at least two battery cells 10 may be disposed in each row. Here, it is preferable that the numbers of battery cells 10 disposed in each row is the same as each other in each row, and accordingly, the battery cells 10 may be disposed in an N×M array form (herein, each of N and M is a natural number of 2 or more). For example, as illustrated in FIGS. 4A to 5, the battery cells 10 are arranged in two rows on the jig plate 100 and two battery cells 20 are disposed in each row, such that the battery cells 10 may be arranged in a 2×2 array form, and accordingly, four battery cells 10 may be accommodated in one chamber 200.

In addition, the sealing unit 300 is configured to seal the battery cells 10 by pressing each of both side surfaces of the pouches of the battery cells 10 arranged in a plurality of rows as described above. Therefore, with the battery cell sealing device 1, the four battery cells are accommodated in one chamber, such that sealing of the four battery cells may be simultaneously performed.

That is, the battery cell sealing device 1 according to the present invention improves insufficiency of processing capacity generated because only two battery cells are accommodated in one chamber in the related art, such that a plurality of battery cells, more specifically, four or more battery cell are accommodated in one chamber and the plurality of battery cell accommodated in the chamber are simultaneously sealed, and thus, production or processing capacity of the battery cells in one chamber may be significantly improved. Accordingly, the total number of chambers in a battery cell manufacturing equipment and the number of vacuum pumps, or the like, corresponding to the total number of chambers are decreased, such that total cost of the battery cell manufacturing equipment may be decreased. In addition, according to the present invention, the chamber may be manufactured in an approximately square shape by disposing the battery cells in a plurality of rows, and accordingly, the chamber may be efficiently disposed within a layout of a limited space as compared with a chamber having an elongated rectangular shape according to the related art.

In all battery cell manufacturing processes, an increase in the number of battery cells accommodated in one chamber is a main factor in improving a battery cell production speed, and as an optimized example of the number of battery cells in one chamber, it is preferable that four battery cells are accommodated in one chamber. In this case, the four battery cells may be arranged in the 2×2 array form as described above.

In addition, referring to FIGS. 4A and 4B again, in the present invention, the jig plate 100 may be slid in a direction (y-direction in FIGS. 4A and 4B) horizontal to a bottom surface (xy plane in FIGS. 4A and 4B) of the chamber 200 to be input into the chamber 200. To this end, the chamber inlet 210 may be formed in one side surface of the chamber 200, and the jig plate 100 may be driven by the above-described driving unit. In addition, the sealing unit 300 may be disposed on the other side surfaces of the chamber 200 except for the chamber inlet 210. As described above, unlike the related art in which the plate 3 on which the battery cells are seated is moved in an upward direction (z direction in FIGS. 1A and 1B) to be input into the chamber 4, in the present invention, the jig plate 100 may be slit in the horizontal direction (y direction of FIGS. 4A and 4B) to be input into the chamber 200. This is advantageous in terms of facility disposition, and since the chamber inlet and the sealing unit are formed at different positions, only the jig plate is moved in a state in which the chamber and the sealing unit are fixed, so that the jig plate on which the battery cells are seated may be easily input into and output from the chamber.

In addition, as illustrated in FIGS. 4A and 4B, the battery cell sealing device according to the present invention may further include a chamber cover 220. The chamber cover 220 closes the chamber inlet 210. In this case, the battery cell sealing device according to the present invention may have a structure in which the chamber cover 220 is coupled to one side of the jig plate 100. Accordingly, the jig plate 100 is input into the chamber 200 through the chamber inlet 210 and at the same time, the chamber inlet 210 is closed by the chamber cover 220, so that an inner portion of the chamber 200 may be entirely closed.

Hereinafter, the sealing unit 300 according to the present invention will be described in more detail. Referring to FIG. 5, the sealing unit 300 according to the present invention may include a first unit 310, a second unit 320, and a third unit 330. In the present invention, battery cells disposed in the outermost one row (the leftmost row in FIG. 5) among the battery cells arranged in at least two rows in the chamber 200 will be referred to as first-row battery cells 10-1, and battery cells disposed in the outermost other row (the rightmost row in FIG. 5) among the battery cells will be referred to as second-row battery cells 10-2.

The first unit 310 may be configured to include first cylinders 311 driven in a transverse axis direction (x-axis direction in FIG. 5) and first sealing bars 315 receiving thrusts in the transverse axis direction by the driving of the first cylinders 311 in the transverse axis direction and pressing one side surfaces of pouches (left side surfaces of the pouches in FIG. 5) of the first-row battery cells 10-1. Here, the first cylinder 311 may be mounted outside the chamber 200, more specifically on the left side of the chamber 200 in FIG. 5, and the first cylinder 311 and the first sealing bar 315 may have, for example, a structure in which the first sealing bar 315 may be coupled to an end portion of a drive shaft of the first cylinder 311. In addition, the first sealing bar 315 may be configured as a heater block for heat-sealing a sealing portion of the pouch. Accordingly, the first unit 310 may press and heat-seal one side surfaces of the pouches (left side surfaces of the pouches in FIG. 5) of the first-row battery cells 10-1.

The second unit 320 may have a symmetric structure to the first unit 310. That is, the second unit 320 may be configured to include second cylinders 321 driven in the transverse axis direction (x-axis direction in FIG. 5) and second sealing bars 325 receiving thrusts in the transverse axis direction by the driving of the second cylinders 321 in the transverse axis direction and pressing the other side surfaces of pouches (right side surfaces of the pouches in FIG. 5) of the second-row battery cells 10-2. Here, the second cylinder 321 may be mounted outside the chamber 200, more specifically on the right side of the chamber 200 in FIG. 5, the second cylinder 321 and the second sealing bar 325 may have, for example, a structure in which the second sealing bar 325 may be coupled to an end portion of a drive shaft of the second cylinder 321, similar to the first unit 310, and the second sealing bar 325 may be configured as a heater block for heat-sealing a sealing portion of the pouch. Accordingly, the second unit 320 may press and heat-seal the other side surfaces of the pouches (right side surfaces of the pouches in FIG. 5) of the second-row battery cells 10-2.

Figure 6:
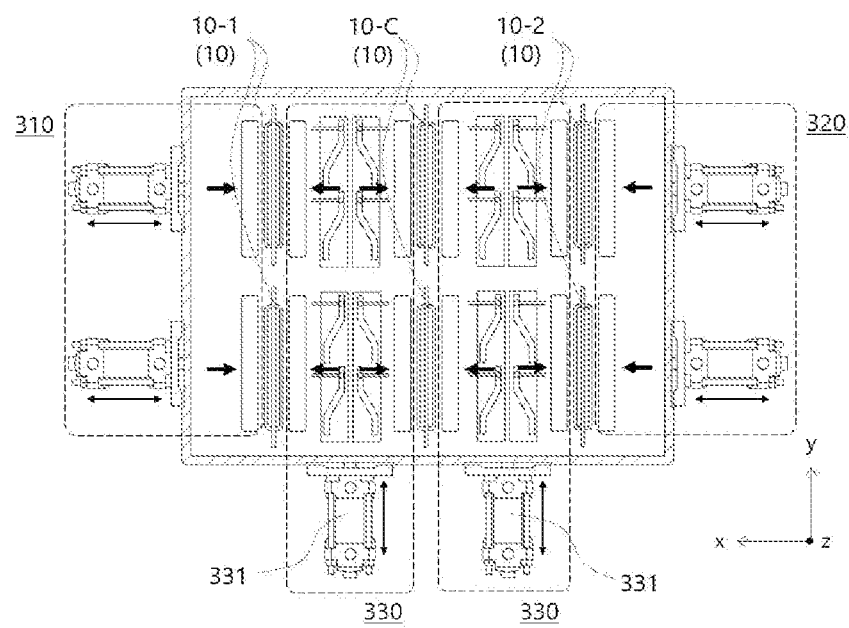
FIG. 6 is a view illustrating an example in which battery cells are arranged in three rows.

The third unit 330 may be positioned between two adjacent rows of the battery cells arranged in two rows, and may press and seal the other side surfaces of the pouches (right side surfaces of the pouches in FIG. 5) of the battery cells disposed in one row (left row in FIG. 5) of the two adjacent rows and press and seal one side surfaces of the pouches (left side surfaces of the pouches in FIG. 5) of the battery cells disposed in the other row (right row in FIG. 5) of the two adjacent rows. For example, when the battery cells are arranged in a 2×2 array as illustrated in FIG. 5, the third unit 330 may be positioned between the first-row battery cells 10-1 and the second-row battery cells 10-2, which are two adjacent rows, and may press and seal the other side surfaces of the pouches (right side surfaces of the pouches in FIG. 5) of the first-row battery cells 10-1 corresponding to one row (left row in FIG. 5) of the two adjacent rows between the first-row battery cells 10-1 and the second-row battery cells 10-2 and press and seal one side surfaces of the pouches (left side surfaces of the pouches in FIG. 5) of the second-row battery cells 10-2 corresponding to the other row (right row in FIG. 5) of the two adjacent rows between the first-row battery cells 10-1 and the second-row battery cells 10-2. Meanwhile, when the battery cells are arranged in, for example, three rows as illustrated in FIG. 6, the third units 330 are disposed between first-row battery cells 10-1 and intermediate-row battery cells 10-C and between the intermediate-row battery cells 10-C and second-row battery cells 10-2, respectively, such that a total of two third units 330 may be provided. In this case, each of the third units 330 may be configured to seal battery cells of one row and the other row of a side on which the corresponding third unit 330 is positioned. Furthermore, when the battery cells are arranged in N rows, a total of N−1 third units 330 may be provided.

Here, the third unit 330 may include a third cylinder 331 driven in a longitudinal axis direction (y-axis direction in FIG. 5), a thrust conversion unit 333 converting a thrust in the longitudinal axis direction by the driving of the third cylinder 331 in the longitudinal axis direction into a thrust in the transverse axis direction (x-axis direction in FIG. 5), and third sealing bars 335 receiving the thrust in the transverse axis direction from the thrust conversion unit 333 and each pressing the other side surfaces of pouches (right side surfaces of the pouches in FIG. 5) of battery cells disposed in one row (left row in FIG. 5) of two adjacent rows and one side surfaces of pouches (left side surfaces of the pouches in FIG. 5) of battery cells disposed in the other row (right row in FIG. 5) of the two adjacent rows. The third sealing bar 335 may also be configured as a heater block like the first and second sealing bars 315 and 325.

As described above, with the battery cell sealing device 1 according to the present invention, the sealing bars 315, 325, and 335 may be positioned on each of both side surfaces of the pouch of each battery cell 10, and the sealing bars 315, 325, and 335 positioned on each of both side surfaces of the pouch of each battery cell 10 may be configured to come into contact with each other to press the sealing portion of the pouch of each battery cell 10 from both sides to simultaneously seal each of the battery cells 10 accommodated in the chamber 200 and arranged in the plurality of rows.

Figure 7:
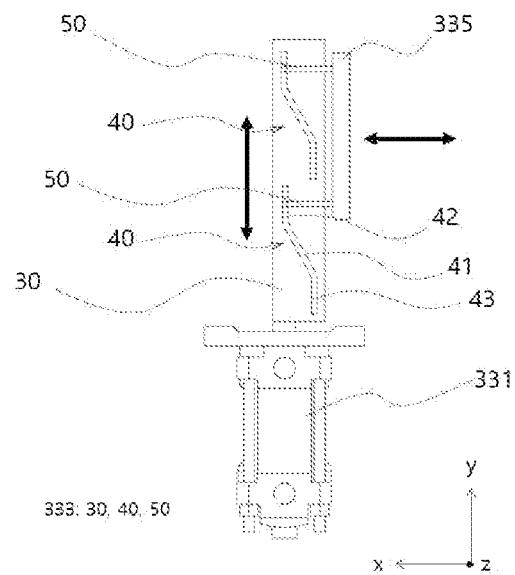
FIG. 7 is an enlarged view of a portion of a thrust conversion unit of a third unit.

FIG. 7 is an enlarged view of a portion of a thrust conversion unit of a third unit. The thrust conversion unit 333 according to the present invention may have a Cam & Follower structure. More specifically, the thrust conversion unit 333 may include a cam body 30 receiving the thrust in the longitudinal axis direction (y-axis direction in FIG. 7) from the third cylinder 331 and reciprocating linearly in the longitudinal axis direction, that is, in a up and down direction in FIG. 7 and a follower 50 having one end in contact with a cam actuating element 40 formed in the cam body and the other end coupled to the third sealing bar 335 and reciprocating linearly along an outer surface of the cam actuating element 40 in the transverse axis direction (x-axis direction in FIG. 7), that is, in a left and right direction in FIG. 7.

The cam actuating element 40 is a kind of guide rail formed in the cam body 30, a plurality of cam actuating elements 40 may be formed in the cam body 30, and the cam actuating element 40 may also be configured to reciprocate linearly along the cam body 30 in the longitudinal axis direction (y-axis direction in FIG. 7). In this case, one end portion of the follower 50 is in contact with the outer surface of the cam actuating element 40 and a position of the follower 50 in the longitudinal axis direction (y-axis direction in FIG. 7) is fixed, such that the follower 50 reciprocates linearly along the outer surface of the cam actuating element 40 in the transverse axis direction (x-axis direction in FIG. 7). Accordingly, the third sealing bar 335 coupled to the other end portion of the follower 50 may be driven in the transverse axis direction (x-axis direction in FIG. 7) to press the pouch of the battery cell 10 in the transverse axis direction (x-axis direction in FIG. 7). The follower 50 is provided with a bearing at one end portion thereof in contact with the outer surface of the cam actuating element 40 or one end portion of the follower 50 is formed in the shape of a curved surface, and the follower 50 may be moved along a shape of the outer surface of the cam actuating element 40 using rolling friction of the bearing or the curved surface to move the third sealing bar 335 in a desired direction.

Figure 8:
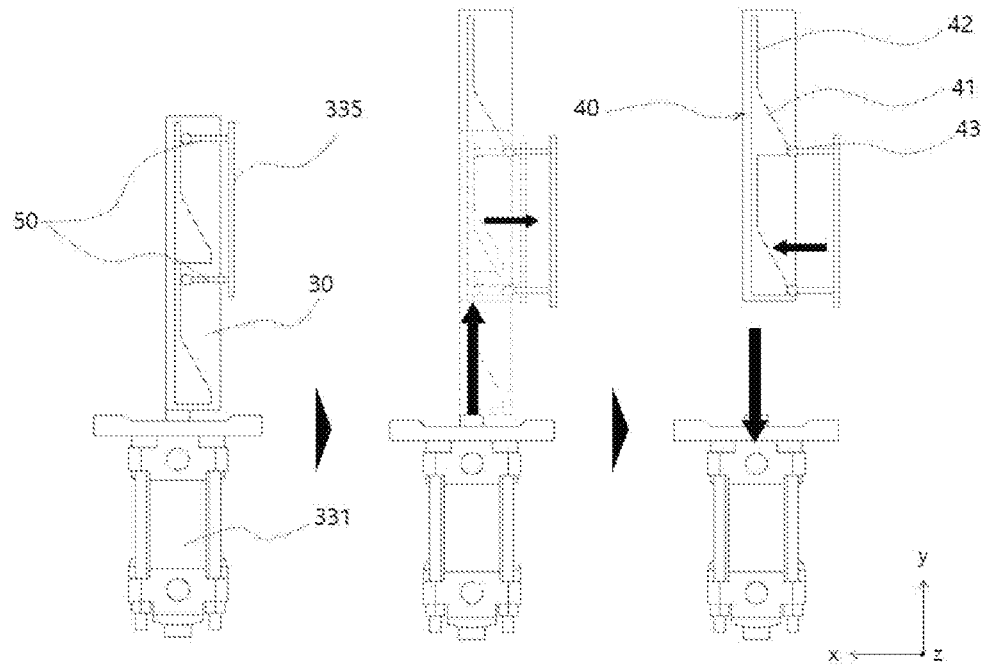
FIG. 8 is a schematic diagram illustrating driving of the third unit.

FIG. 8 is a schematic diagram illustrating driving of the third unit. As illustrated in FIG. 8, the driving of the third cylinder 331 in the longitudinal axis direction (y-axis direction in FIG. 8) is transferred to the cam body 30, a thrust of the cam body 30 in the longitudinal axis direction (y-axis direction in FIG. 8) is transferred to the follower 50 through the cam actuating element 40 and then converted into a thrust in the transverse axis direction (x-axis direction in FIG. 8), and accordingly, the sealing bar 335 coupled to the other end portion of the follower 50 may reciprocate linearly in the transverse axis direction (x-axis direction in FIG. 8). Specifically, when the third cylinder 331 moves forward in the longitudinal axis direction, the third sealing bar 335 moves forward in the transverse axis direction, and when the third cylinder 331 moves backward in the longitudinal axis direction, the third sealing bar 335 also moves backward in the transverse axis direction.

Here, the cam actuating element 40 according to the present invention may have a wedge cam structure. More specifically, referring to FIGS. 7 and 8, the cam actuating element 40 may have a structure including a wedge surface 41 having a predetermined inclination with respect to the longitudinal axis direction (y-axis direction of FIGS. 7 and 8), and parallel surfaces 42 and 43 extending by a predetermined distance in parallel to the longitudinal axis direction (y-axis direction in FIGS. 7 and 8) may be formed at both end portions of the wedge surface 41, respectively. This is advantageous in transferring a uniform thrust to the plurality of cam actuating elements formed in the cam body when the cam body is formed to be elongated in the longitudinal axis direction (y-axis direction in FIGS. 7 and 8) as in the present invention.

Furthermore, the plurality of cam actuating elements 40 may be formed in the cam body 30 according to the present invention so that two or more cam actuating elements 40 are provided for each of the third sealing bars 335, and accordingly, the third sealing bar 335 may be supported by two or more followers 50. Referring to FIGS. 7 and 8 again, two or more cam actuating elements 40 are provided for one third sealing bar 335, and the follower 50 is provided for each cam actuating element, such that a total of two or more followers 50 may be provided for one third sealing bar 335. As described above, two or more followers may be able to support the third sealing bars to prevent each of the third sealing bars from being twisted when the thrust is transferred to each of the third sealing bars and to allow the sealing bars to firmly support each other when the third sealing bar comes into contact with an opposite side sealing bar (i.e., the first sealing bar, the second sealing bar, or another third sealing bar).

Meanwhile, referring to FIGS. 5 and 6 again, the first unit 310 is provided with the same number of the first cylinders 311 as the number of first-row battery cells 10-1, that is, the number of battery cells disposed in a first row, such that the first cylinders 311 may be provided for the first-row battery cells 10-1, respectively, and the second unit 320 is provided with the same number of the second cylinders 321 as the number of second-row battery cells 10-2, such that the second cylinders 321 may be provided for the second-row battery cells 10-2, respectively. As described above, the cylinder is provided for each battery cell, and thus, a pressing force, sealing position accuracy, and the like, may be improved.

In addition, one third cylinder 331 may be provided in the third unit 330. That is, the cam body 30 of the third unit 330 may be configured to receive a thrust in the longitudinal axis direction from one third cylinder 331, and when a plurality of third units 330 are provided as illustrated in FIG. 6, one third cylinder 331 may be provided in each of the third units 330. As described above, one third cylinder is provided in one cam body, such that a total area of the battery cell manufacturing equipment may be decreased. Furthermore, when the plurality of third units are provided, each third cylinder is provided in the cam body of each of the plurality of third units, such that a support force with the opposite side sealing bar in contact with the third sealing bar of the third unit may be further improved.

As described above, the battery cell sealing device according to the present invention is configured to be capable of simultaneously sealing the plurality of battery cells accommodated in one chamber and arranged in the plurality of rows by pressing each of the pouches of the plurality of battery cells from both side surfaces, such that the number of battery cells that may be accommodated and processed in one chamber may be increased to significantly improve a production speed. Furthermore, the number of chambers in the battery cell manufacturing equipment and the number of vacuum pumps, or the like, corresponding to the number of chambers are decreased, such that total equipment cost may be decreased, such that cost or an area of the battery cell manufacturing equipment may be decreased.

According to the present invention, a plurality of battery cells, more specifically, four or more battery cell are accommodated in one chamber and the plurality of battery cell accommodated in the chamber are simultaneously sealed, and thus, production or processing capacity of the battery cells in one chamber may be significantly improved. Accordingly, the total number of chambers in a battery cell manufacturing equipment and the number of vacuum pumps, or the like, corresponding to the total number of chambers are decreased, such that total cost of the battery cell manufacturing equipment may be decreased.

In addition, according to the present invention, the chamber may be manufactured in an approximately square shape by disposing the battery cells in a plurality of rows, and accordingly, the chamber may be efficiently disposed within a layout of a limited space as compared with a chamber having an elongated rectangular shape according to the related art.

Although embodiments of the present invention have been hereinabove described with reference to the accompanying drawings, those skilled in the art to which the present invention pertains will be able to understand that the present invention may be implemented in other specific forms without departing from the spirit or essential feature of the present invention. Therefore, it is to be understood that embodiments described hereinabove are illustrative rather than being restrictive in all aspects.

What is claimed is:

1. A battery cell sealing device comprising:
a jig plate on which a plurality of battery cells are seated;
a chamber in which the jig plate on which the battery cells are seated is accommodated; and
a sealing unit sealing each of the battery cells accommodated in the chamber,
wherein the battery cells are arranged in at least two rows in the chamber, and at least two battery cells are disposed in each row,
wherein the sealing unit includes:
a first sealing unit pressing and sealing one side surfaces of pouches of first-row battery cells disposed in the outermost one row among the battery cells arranged in the at least two rows;
a second sealing unit pressing and sealing the other side surfaces of pouches of second-row battery cells disposed in the outermost other row among the battery cells arranged in the at least two rows; and
a third unit positioned between two adjacent rows of the battery cells arranged in the at least two rows and pressing and sealing the other side surfaces of pouches of battery cells disposed in one row of the two adjacent rows and press and seal one side surfaces of pouches of battery cells disposed in the other row of the two adjacent rows,
wherein the third unit includes a third cylinder driven in a longitudinal axis direction, a thrust conversion unit converting a thrust in the longitudinal axis direction by the driving of the third cylinder in the longitudinal axis direction into a thrust in a transverse axis direction, and third sealing bars receiving the thrust in the transverse axis direction from the thrust conversion unit and each pressing the other side surfaces of the pouches of the battery cells disposed in one row of the two adjacent rows and the one side surfaces of the pouches of the battery cells disposed in the other row of the two adjacent rows.

2. The battery cell sealing device of claim 1, wherein the first sealing unit includes first cylinders driven in a transverse axis direction and first sealing bars receiving thrusts in the transverse axis direction by the driving of the first cylinders in the transverse axis direction and pressing the one side surfaces of the pouches of the first-row battery cells, and the second sealing unit includes second cylinders driven in the transverse axis direction and second sealing bars receiving thrusts in the transverse axis direction by the driving of the second cylinders in the transverse axis direction and pressing the other side surfaces of the pouches of the second-row battery cells.

3. The battery cell sealing device of claim 2, wherein the first sealing unit is provided with the same number of the first cylinders as the number of first-row battery cells, such that the first cylinders are provided for the first-row battery cells, respectively, and the second sealing unit is provided with the same number of the second cylinders as the number of second-row battery cells, such that the second cylinders are provided for the second-row battery cells, respectively.

4. The battery cell sealing device of claim 1, wherein the thrust conversion unit includes:

a cam body receiving the thrust in the longitudinal axis direction from the third cylinder and reciprocating linearly in the longitudinal axis direction; and a follower having one end in contact with a cam actuating element formed in the cam body and the other end coupled to one of the third sealing bars and reciprocating linearly along an outer surface of the cam actuating element in the transverse axis direction.

5. The battery cell sealing device of claim 4, wherein the cam actuating element has a structure including a wedge surface inclined with respect to the longitudinal axis direction.

6. The battery cell sealing device of claim 4, wherein a plurality of cam actuating elements are formed in the cam body so that two or more cam actuating elements are provided for each of the third sealing bars, and one of the third sealing bars is supported by two or more followers.

7. The battery cell sealing device of claim 4, wherein a bearing is provided at one end portion of the follower in contact with the outer surface of the cam actuating element.

8. The battery cell sealing device of claim 4, wherein one end portion of the follower in contact with the outer surface of the cam actuating element is formed as a curved surface.

9. The battery cell sealing device of claim 1, wherein one third cylinder is provided in the third sealing unit.

10. The battery cell sealing device of claim 1, wherein the jig plate is slid in a direction horizontal to a bottom surface of the chamber to be input into the chamber.

11. The battery cell sealing device of claim 10, wherein a chamber inlet through which the jig plate is to be input into the chamber is formed in one side surface of the chamber, and the sealing unit is disposed on the other side surfaces of the chamber except for the one side surface of the chamber in which the chamber inlet is formed.

12. The battery cell sealing device of claim 10, wherein a chamber cover closing the chamber is coupled to the jig plate, and the jig plate is input into the chamber and at the same time, the chamber is closed by the chamber cover.

13. The battery cell sealing device of claim 1, wherein the battery cells are arranged in a 2×2 array form in the chamber.

* * * * *